United States Patent [19]

Buhot et al.

[11] Patent Number: 5,326,309
[45] Date of Patent: Jul. 5, 1994

[54] ANIMAL EVISCERATION

[75] Inventors: John W. Buhot, Coorparoo; Edward G. Mills, Wilston; Andrew M. Leiner, Sunnybank; Darryl J. Heidke, Morningside; William J. Witham, Birkdale, all of Australia

[73] Assignees: Commonwealth Scientific & Industrial Research Organisation, Australian Capital Territory; Meat Research Corporation, New South Wales, both of Australia

[21] Appl. No.: 975,534

[22] PCT Filed: Jun. 18, 1992

[86] PCT No.: PCT/AU92/00296

§ 371 Date: Feb. 18, 1993

§ 102(e) Date: Feb. 18, 1993

[87] PCT Pub. No.: WO92/22210

PCT Pub. Date: Dec. 23, 1992

[30] Foreign Application Priority Data

Jun. 18, 1991 [AU] Australia .................. PK6734

[51] Int. Cl.⁵ .......................................... A22B 5/20
[52] U.S. Cl. .................................. 452/106; 452/118; 452/160
[58] Field of Search ............... 452/106, 117, 118, 120, 452/160

[56] References Cited

U.S. PATENT DOCUMENTS

| | | | |
|---|---|---|---|
| 3,886,635 | 6/1975 | Meyn | 452/118 |
| 4,087,886 | 5/1978 | Aubert | 452/106 |
| 4,951,352 | 8/1990 | Harben, III et al. | 452/106 |
| 5,026,317 | 6/1991 | Kennedy | 452/106 |
| 5,062,820 | 11/1991 | Rankin et al. | 452/160 |

FOREIGN PATENT DOCUMENTS

| | | |
|---|---|---|
| 32707/84 | 3/1985 | Australia . |
| 29199/89 | 6/1989 | Australia . |
| 67906/90 | 6/1991 | Australia . |
| 0094724 | 11/1983 | European Pat. Off. . |
| 0178272 | 4/1986 | European Pat. Off. . |
| 2355827 | 6/1974 | Fed. Rep. of Germany . |

*Primary Examiner*—Willis Little
*Attorney, Agent, or Firm*—Lowe, Price, LeBlanc & Becker

[57] ABSTRACT

A process of eviscerating an inverted animal carcass (10) inclined at 35° to 40° includes pushing the viscera (30) comprising both the thoracic viscera (31) and abdominal viscera (32) in a direction (B) from the cranial end (11) of the carcass (10) towards the caudal end (12) so as to pass between the hind legs (13) and fall from the carcass. Connecting tissues including the aorta (35) and external iliac arteries (36) are partially severed prior to pushing the viscera from the carcass so that the viscera detaches completely from the carcass after being pushed between the hind legs (13). The diaphragm (25) may be pierced at its periphery so that the force of the pushing operation causes the diaphragm to tear around its peripheral edges from the walls of the thoracic cavity. The pubic symphysis (60) is split before the pushing operation whereby the viscera (30) can pass both above and below and through the split in the pubic symphysis (60). Alternatively, the pubic symphysis (60) need not be split prior to the pushing operation whereby the viscera (30) travels over the pubic symphysis (60). A pushing member (41) commences to push on the thoracic viscera (31) at about the fifth rib and travels at 0.5 to 0.6 meters per second.

17 Claims, 3 Drawing Sheets

ANIMAL EVISCERATION

FIELD OF THE INVENTION

This invention relates to evisceration of animals, and particularly to processes and apparatus for use in eviscerating beef and other animals in abattoirs, boning plants, etc.

BACKGROUND OF THE INVENTION

In Patent Specification No. WO89/05584 there is described a process and apparatus for evisceration of an animal carcass such as beef carcass. The process described in that specification includes steps such as cutting of the pubic symphysis or "aitch bone", cutting of the sternum or "brisket", and, while the carcass is suspended by the legs and with the head or cranial end of the carcass higher than the rump or caudal end, moving an apparatus into the abdominal cavity to cut away the diaphragm by contouring up the inside of the walls of the abdominal cavity. While the carcass is oriented head up, a mechanical scoop enters the thoracic cavity at the neck and is moved down along the spine inside the carcass to clear the thoracic viscera (the "pluck") and finally push the complete viscera including the paunch and kidneys between the hind legs. The complete viscera remains attached by the external iliac arteries on opposite sides of the spine and/or by the aorta and to detach the viscera, a mechanical gripper is advanced to clamp and pull or cut the remaining attachments.

SUMMARY OF THE INVENTION

The process and apparatus described in WO89/05584 therefore requires several modules or apparatuses, namely the aitch bone cutting apparatus, the brisket cutting apparatus, the diaphragm cutting apparatus, the viscera removal apparatus and the viscera connection severance apparatus, in addition to the need for manual dressing or preparation operations at one or more points in the operation.

It is an object of the present invention to simplify and/or make more effective the process and apparatus for eviscerating an animal carcass.

It is a further object to provide a process and apparatus for automating substantial parts of a carcass evisceration operation.

According to the present invention this is provided a process of eviscerating an animal carcass including the step of pushing the viscera comprising both the thoracic viscera and abdominal viscera in a direction (B) from the cranial end of the carcass towards the caudal end so that the thoracic viscera is pushed into the abdominal cavity and the viscera is pushed from the carcass between the hind legs of the carcass, the process being characterised by the step of at least partially severing connecting tissues prior to pushing the viscera from the carcass, the connecting tissues comprising tissues which might otherwise support the viscera and prevent the viscera falling from and detaching completely from the carcass after being pushed between the hind legs.

Preferably the tissues which are at least partially severed comprise external iliac arteries and/or the aorta.

The step of severing connecting tissues may be carried out during a dressing operation, the connecting tissues being located between the thoracic or abdominal viscera and the walls of the thoracic or abdominal cavity so that when the pushing operation causes the abdominal and thoracic viscera to emerge from the carcass, the ejected viscera can separate from the remainder of the carcass under their own weight. In the preferred process, the carcass is suspended in an inverted position with the cranial end of the carcass elevated above the caudal end, the pushing process causing the viscera to be ejected between the hind legs of the carcass and to fall from the suspended carcass onto a viscera collection area such as a conveyor. In order to enable the viscera to fall and detach completely from the suspended carcass, the severance of connecting tissues may be carried out in a dressing operation, e.g. when manual operations such as removal of the pizzle and erector muscles, clearing and pulling the rectum and bunging of the sphincter, bagging the anus, and sealing the end of the rectum to eliminate contamination, are being carried out on the carcass which is suspended with the caudal end higher from the cranial end. The connecting tissues preferably comprise the arteries known as the aorta and the external iliac arteries. These arteries, if not severed will tend to support the viscera after being pushed from the carcass between the hind legs and necessitate either manual severance of the viscera or provision of apparatus for this purpose. The aorta and external iliac arteries are desirably severed where the external iliac arteries branch away from the aorta, adjacent to the sixth lumbar vertebrae. The step of pushing the viscera may be carried out without cutting of the diaphragm around the periphery thereof so that as the pushing operation occurs, the diaphragm tears from the walls of the thoracic cavity. Prior to the pushing operation the diaphragm may be pierced at its periphery so that the force of the pushing operation acting through the thoracic viscera onto the diaphragm causes the diaphragm to tear around its peripheral edges from the walls of the thoracic cavity. The piercing of the diaphragm may be carried out at a ventral portion of the periphery, i.e. remote from the part of the periphery closest to the spine, and, if desired, at other points around the periphery.

The piercing of the diaphragm may be carried out manually during a preliminary dressing operation of the carcass prior to the step of pushing the viscera. Alternatively, the piercing of the diaphragm may be carried out by brisket shearing means which includes a reaction member which is located in the belly and is advanced from the belly so as to lie beneath the brisket, the leading part of the reaction member piercing the diaphragm at the ventral edge as it is advanced to its position beneath the brisket, a shearing blade being cooperable with the reaction member to shear the brisket.

Preferably the carcass is suspended in an inverted position during the pushing operation with the cranial end of the carcass elevated above the caudal end whereby the viscera is ejected between the hind legs of the carcass and falls from the suspended carcass onto a viscera collection area. Preferably the spine of the carcass is at an angle of at least 30° to the horizontal during the process of pushing the viscera from the carcass, and most desirably the angle is between 35° and 40°.

The pushing of the viscera in the direction (B) from the cranial end towards the caudal end is preferably carried out at a speed between 0.5 and 0.6 meters per second.

Preferably the viscera drops from the rump of the carcass to the viscera collection area over a distance of at least 1,500 mm so that there is sufficient height for the weight of the viscera to cause complete clearance of the viscera from the carcass.

In one possible embodiment, the pubic symphysis is split before the pushing operation whereby the viscera can pass both above and below and through the split in the pubic symphysis. The hind legs may be held separated during the pushing of the viscera 30 from the carcass, the separation of the hind legs being sufficient to produce a split in the pubic symphysis of at least 30 mm in width, and preferably about 55 mm in width.

In an alternative embodiment, the pubic symphysis is not split prior to the pushing operation whereby the viscera travels over the pubic symphysis and any portions of the viscera which would otherwise pass beneath the pubic symphysis will be lifted and pass with the main bulk of the viscera out between the hind legs after passing over the top of the pubic symphysis. In this embodiment, the process may include the step of pushing any viscera which might tend to pass beneath the pubic symphysis into the abdominal cavity before commencing the pushing operation so as to be pushed or to fall past the pubic symphysis over the top thereof when the pushing operation is being carried out.

The present invention also provides apparatus for carrying out the evisceration process, the apparatus being characterised by suspension means for suspending the carcass in an inverted position with the cranial end of the carcass elevated above the caudal end, and pushing means for pushing the viscera from the cranial end towards the caudal end of the carcass, the pushing means including a pushing member and support means, the support means being operative to insert the pushing member into the thoracic cavity and being operative to drive the pushing member in the direction (B) from the cranial end towards the caudal end so as to push the viscera between the hind legs which fall and separate from the carcass.

The pushing member is preferably inserted into the thoracic cavity generally between the third and fifth ribs and commences to push on the thoracic viscera at about the fifth rib.

The support means may include a main support and a secondary support to which the pushing member is mounted, the secondary support being resiliently movable relative to main support, the support means including biasing means which urges the pushing member into engagement with the spine so that the pushing member can contour along the spine during the pushing movement thereof.

The further particular and preferred features of the process and apparatus embodying the present invention will be described with particular reference to the accompanying drawings, although these drawings are illustrative only and are not limiting on the scope of the invention. In the drawings:

BRIEF DESCRIPTION OF THE PREFERRED EMBODIMENT

FIG. 1 is a schematic side view of an evisceration apparatus according to a possible embodiment of the present invention in use with a suspended carcass, FIG. 2 is a side view of an alternative possible embodiment of an evisceration apparatus, FIG. 3 shows an operator performing preliminary dressing operations as part of the evisceration process, and FIG. 4 is a side view of a brisket cutting apparatus for use in conjunction with the evisceration apparatus.

DETAILED DESCRIPTION OF THE PREFERRED EMBODIMENT

Prior to the main operation of pushing visceral from the carcass 10, generally known dressing operations may be carried out, as described in patent specification No. WO89/05584. For example, the carcass may be supported by a cradle so that the spine 15 is located beneath the carcass and the legs elevated. In this position the belly can be opened, initial stages of the hide workup can be carried out, complete cleaning of the oesophagus, trachea and subclavian arteries from the thoracic cavity can take place. Following the horizontal dressing process, the carcass can be elevated and suspended by the legs. With the cranial end 11 lower than the caudal end 12, operations such as cutting of the pubic symphysis or "aitch bone", head removal and hide pulling can be carried out.

Figure 3:
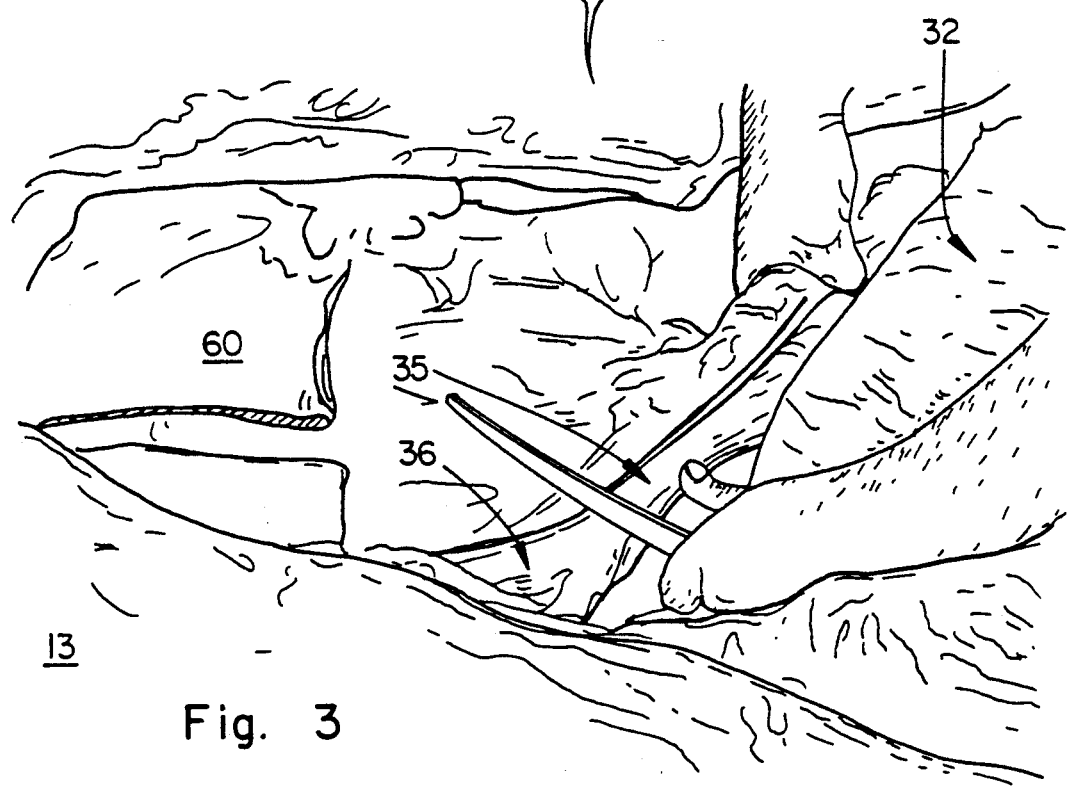

At a further stage, the carcass can be suspended with the cranial end 11 lower than the caudal end 12 enabling further operations to be carried out manually, such as removal of the tongue, and clearing and bunging operations. At this stage also the connecting tissues, particularly the external iliac arteries 36 and aorta 35 can be severed as shown in FIG. 3 preparatory to the pushing of the viscera 30 from the carcass 10.

Figure 4:
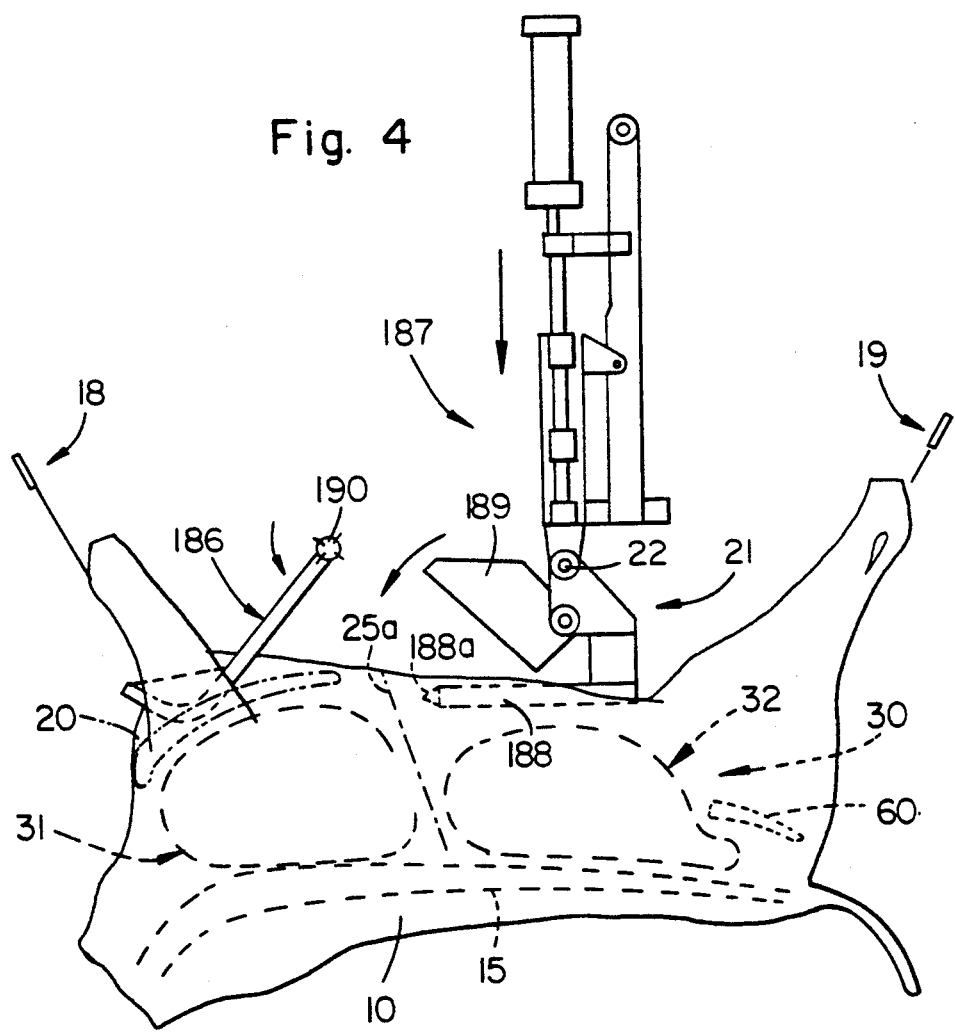

The brisket 20 may be cut by apparatus as shown in FIG. 4, (which is further illustrated and described in Specification No. WO89/05584) after the horizontal bed dressing operations and prior to the dressing operations on the suspended carcass. Referring to FIG. 4, the carcass 10 is presented for brisket cutting when supported horizontally, suspended by the four legs following hide removal and prior to evisceration. The brisket 20 is centralised With locating means 186 comprised by a V-shaped clamp pad acting directly on the brisket region. Cutting is achieved by an hydraulic knife edge shear blade 189 that can cut-through the brisket 20. In operation, a shear reaction member 188 is lowered through the belly between the brisket 20 the pizzle, stopping when it is below the line of the brisket 20. The shearing means 21 can then advance forward a preset distance so that the brisket 20 is between the blade 189 and the reaction member 188. The blade 189 then acts to cut, open, and advance forward to the next preset cutting point. By opening the blade 189 and advancing the unit 187, a number of cuts may be made as the unit advances forwardly to complete a cut through the entire length of the brisket 20. The relevant sections of Specification No. WO89/05584 should be consulted if the nature of the construction and operation of the brisket cutting apparatus is to be more fully understood.

During the insertion of the reaction member 188 of the brisket cutting apparatus and movement of that reaction member or anvil 188 forwardly to lie beneath the brisket 20, the diaphragm 25 can be torn or pierced by the leading end 188a of the reaction member 188.

Alternatively, or in addition, the diaphragm 25 can be cut manually during the horizontal bed dressing operations. The cutting of the diaphragm 25 can comprise merely piercing the diaphragm at the ventral edge 25a so that the diaphragm tears away from the walls of the thoracic cavity during removal of the viscera 30. Alternatively the diaphragm 25 can be substantially completely separated manually. Separation of the diaphragm can be commenced at the xiphoid cartilage (at the posterior end of the sternum) and the cuts can be continued down the walls of the rib cage so as to sever the diaphragm as close as possible to the thin skirt and the cuts being completed as near as possible to the spine 15. Performing a complete cut around the periphery of the diaphragm with the carcass horizontal can be difficult and dangerous because the operator is working without vision in an area with limited access. This increases the possibility of accidentally cutting the operator's hand or an internal organ of the carcass. However, tilting the carcass 10 at an angle between 20° and 30° to the horizontal with the carcass head up allows the abdominal viscera 32 to fall towards the rear of the carcass and provide better physical access and visibility.

Figure 1:
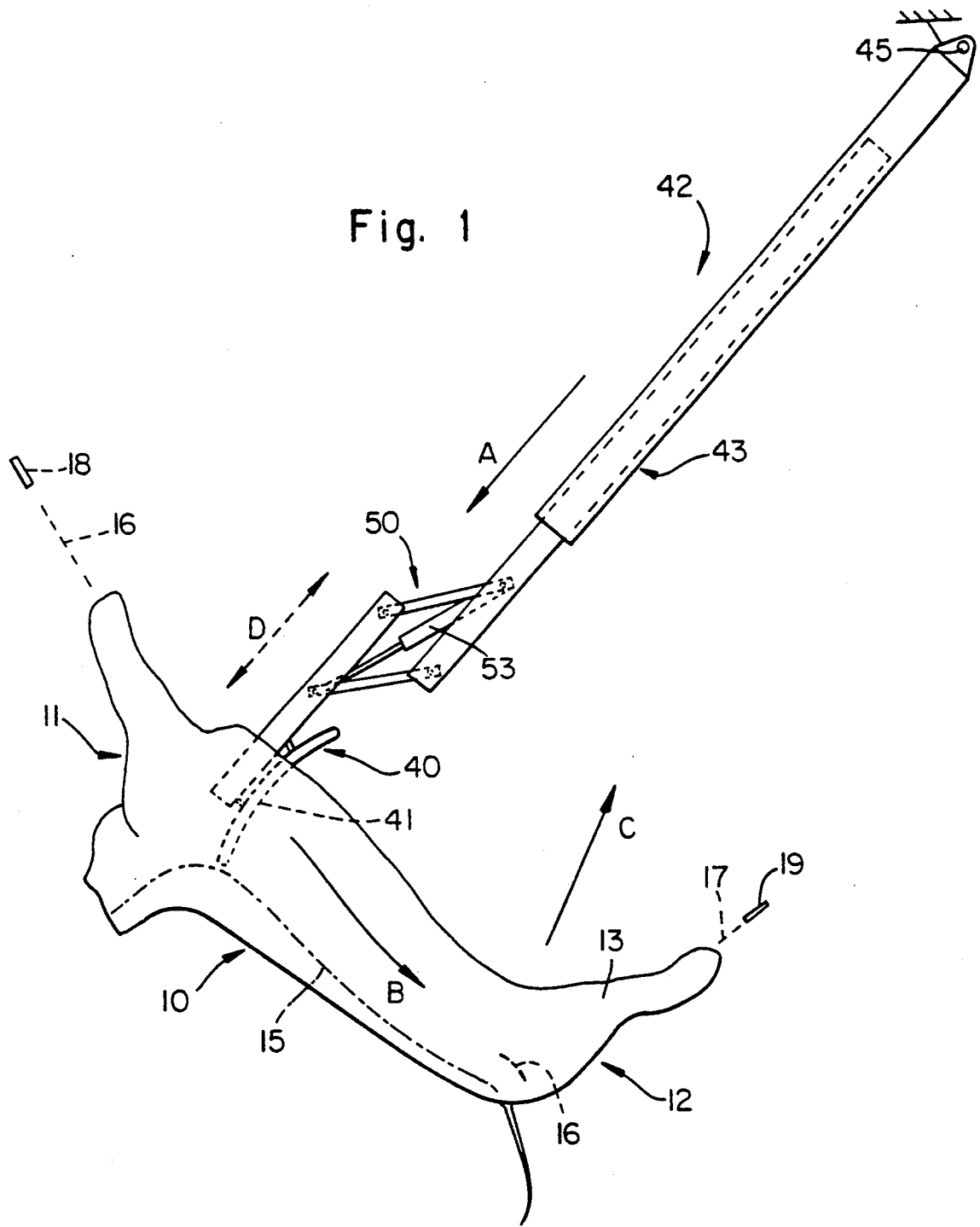

The evisceration apparatus shown in FIG. 1 includes a pusher 40 shown in the general form of a scoop 41 which is mounted to support means 42. The support means includes a main support section 43 which is telescopically movable to enable the pusher 40 to be advanced into the thoracic cavity (as shown in the direction of arrow A). Between the second and fourth ribs is considered the best starting point for the scoop 41. A starting point further towards the rear of the carcass would require greater manual clearing of the thoracic cavity. The spine begins to curve at the first rib to form the neck and the path of movement of the scoop 41 would be more complex if it started near the first rib, The support 42 is then pivoted about pivot pin 45 to sweep or advance the scoop 41 along the carcass 10 in the direction of arrow B, i.e. from the cranial end 11 towards the caudal end 12, thereby pushing the thoracic and abdominal viscera from the carcass between the hind legs 13. In the preferred embodiment, the pubic symphysis 60 is split prior to the evisceration and the hind legs 13 are separated so that a gap width of at least 30 mm and preferably about 55 mm is achieved in the split in the pubic symphysis. This enables the scoop 41 to travel at least partially into the split. When the scoop 41 is approximately adjacent to the kidneys' position, the scoop 41 can be withdrawn by retracting movement of the main support section 43 as shown by arrow C. The scoop 41 and support 42 can be then moved away from the carcass 10 to a washing and sterilising station. e.g. a cabinet (not shown).

The support 42 also includes a secondary support 50 shown as a parallelogram linkage arrangement between the scoop support 51 and the main support 43. This secondary support 50 enables the scoop 41 to move resiliently in directions of arrow D as the scoop 41 is advanced by the main support 43 in direction of arrow B. To achieve this resilient movement, there is provided a pneumatic cylinder 53 or other resilient biasing means so that the scoop 41 will be urged against the spine 15 of the carcass and will follow the profile of the spine 15 as it is advanced. Both pivoting movement and telescoping of the main support 43 can be achieved by hydraulic means.

The carcass 10 is shown suspended by the legs by hooks 16, 17 mounted to travel along associated rails 18. 19. A straight line between the rails 18 and 19 defines an angle to the horizontal and the spine 15 of the carcass 10 is inclined to the horizontal at generally this same angle. This angle is preferably in the range 30° to 45° and most preferably in the range 35° to 40°. Angles of less than 30° can lead to difficulties in successful evisceration because of reduced gravity assistance. Above 45°, gravity assistance does not significantly improve however the spines of medium sized beef carcasses can distort causing the scoop 40 to lift from the spine 15 and impede successful evisceration. Successful trials at 37° were conducted for a wide range of animal sizes.

The speed of advance of the pushing means 40 is preferably in the range 0.5 to 0.6 meters per second and most preferably at 0.55 meters per second. Slower speeds produce unacceptably long push times and an increased probability of unsuccessful evisceration due to insufficient momentum of the viscera. Higher speeds than the optimum can result in the pushing means 40 pushing into the viscera 30 leading to the possibility of the viscera being flattened and possibly damaged at the pubic symphysis 60.

The viscera 30 emerges between the hind legs 13 and falls to a viscera collection area, such as a tray or conveyor. Larger animals require a larger drop height than small animals. In the case of beef, a drop height of at least 1,500 mm measured from the rump to the viscera collection area is preferred. A height significantly larger than this would increase the probability of the paunch bursting and viscera splash and possible contamination of adjacent areas.

Figure 2:
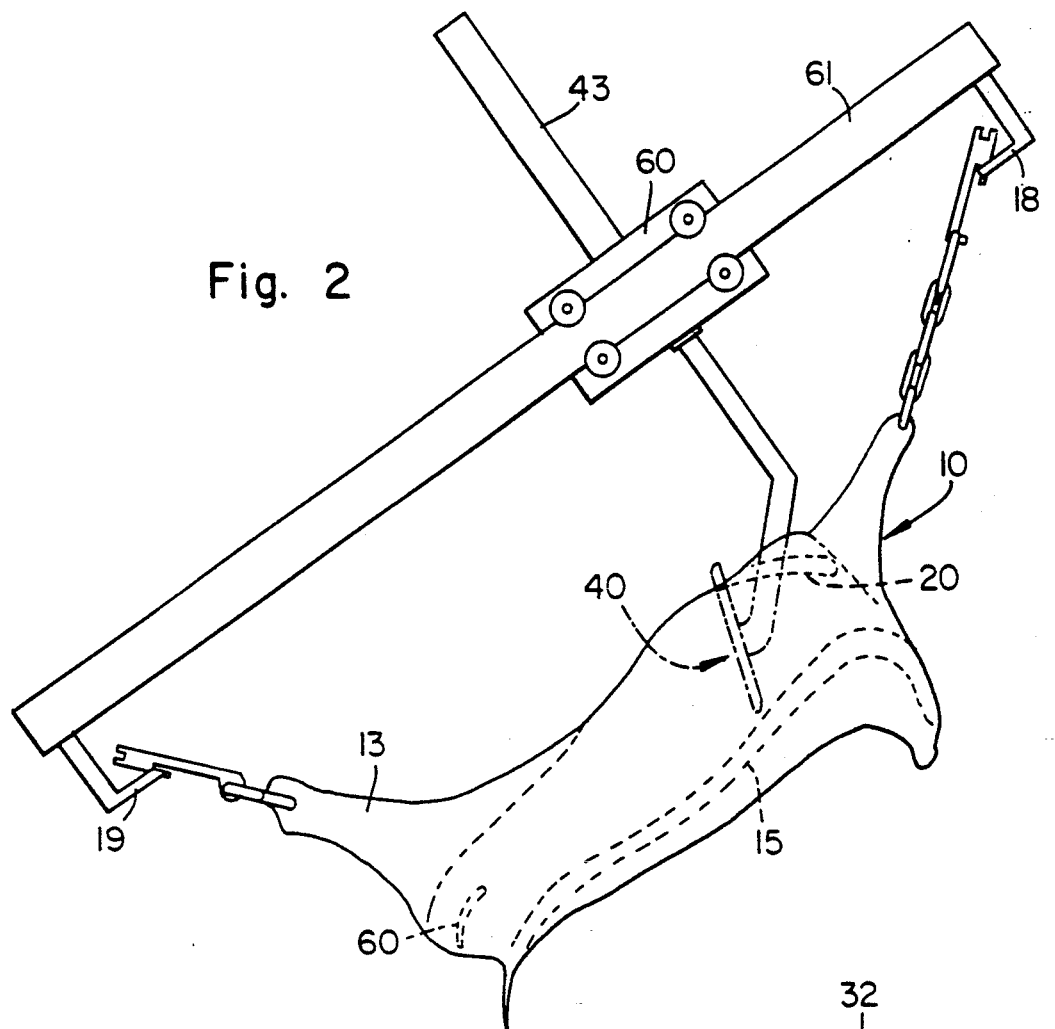

In FIG. 2, an alternative construction of evisceration apparatus includes a carriage 60 which is driven along rails 61 which extend between the rails 18, 19 from which the carcass 10 is suspended. The carriage 60 provides a mounting for main support section 43, the lower end of which is provided with the pusher 40. By driving the carriage along the rails 61, the pusher 40 can travel along the spine 15 so as to push the viscera 30 from the carcass between the hind legs 13.

It will be seen that the preferred method and apparatus according to the present invention as herein described and illustrated enables the viscera to be removed from an animal carcass 10 in a relatively simple and effective manner. The pusher 40 starts at the third rib and tracks down the spine pushing the heart, lungs and the paunch and separating the connecting tissues and the aorta from the spine. The complete viscera, including the kidneys is cleared from the abdominal cavity between the hind legs. The process can be carried out with the diaphragm left intact or merely pierced at one point or substantially completely separated. Thus, if desired, the diaphragm cutting apparatus used in the system described in patent specification WO89/005584 can be eliminated. Also the step of at least partially severing the connecting tissues, particularly the external iliac arteries and aorta in a preliminary dressing operation, enables the elimination of the viscera severence apparatus previously required.

It is believed that the pubic symphysis or aitch bone cutting operation and associated apparatus described in WO89/005584 may also be eliminated. The thoracic and abdominal viscera will predominantly travel over the pubic symphysis 60 if it is not cut prior to the evisceration operation and any portions of the viscera which pass beneath the pubic symphysis, such as the bagged anus, will be lifted back from under the pubic symphysis and will pass with the main bulk of the viscera out between the hind legs 13 after passing over the top of the pubic symphysis 60. However, it is also possible to include an additional dressing step of pushing the bagged anus, and/or any other viscera which might tend to pass beneath the pubic symphysis if it is not cut, into the abdominal cavity so as to fall or be pushed past the pubic symphysis over the top thereof when the carcass is inverted and the pushing operation is being carried out. During such a process without prior splitting of the pubic symphysis, the pusher can travel along the spine and lift from the spine in the region of the diaphragm to pass over the pubic symphysis.

It is to be understood that various alterations, modifications and/or additions may be made to the features of the possible and preferred embodiment(s) of the invention as herein described without departing from the spirit and scope of the invention as defined in the claims.

We claim:

1. A process of eviscerating an animal carcass having a cranial end and a caudal end and having visera comprising both thoracic viscera and abdominal viscera, the process comprising the steps of:

suspending the carcass with the cranial end lower than the caudal end and, while the carcass is suspended in this position, at least partially severing connecting tissues selected from the aorta and the external iliac arteries, these tissues being tissues which might without being severed support the viscera and prevent the viscera falling from and detaching completely from the carcass during removal thereof;

subsequently suspending the carcass so as to be substantially horizontal and, while the carcass is suspended in the horizontal position, cutting the brisket; and subsequently suspending the carcass so that the cranial end of the carcass is elevated above the caudal end and while in this position pushing the viscera including both the thoracic viscera an abdominal viscera in a direction from the cranial end of the carcass towards the caudal end so that the thoracic viscera are pushed into the abdominal cavity and the viscera are pushed from the carcass between the hind legs of the carcass so as to fall from and detach completely from the carcass after passing between the hind legs.

2. A process as claimed in claim 1, characterized in that the step of pushing the viscera is carried out without cutting of the diaphragm around the periphery thereof so that as the pushing operation occurs, the diaphragm tears from the walls of the thoracic activity.

3. A process as claimed in claim 2, characterized in that prior to the pushing operation the diaphragm is pierced at its periphery so that the force of the pushing operation acting through the thoracic viscera onto the diaphragm causes the diaphragm to tear around its peripheral edges from the walls of the thoracic cavity.

4. A process as claimed in claim 3, characterized in that the piercing of the diaphragm is carried out at a ventral portion of the periphery.

5. A process as claimed in claim 3, characterized in that the piercing of the diaphragm is carried out manually during a preliminary dressing operation of the carcass prior to the step of pushing the viscera.

6. A process as claimed in claim 4, characterized in that the brisket cutting is carried out by brisket shearing means and piercing of the diaphragm is carried out by brisket shearing means which includes a reaction member which is located in the belly and is advanced from the belly so as to lie beneath the brisket, the leading part of the reaction member piercing the diaphragm at the ventral edge as it is advanced to its position beneath the brisket, a shearing blade being cooperable with the reaction member to shear the brisket.

7. A process and claimed in claim 1, characterized in that the spine of the carcass is at an angle of at least 30° to the horizontal during the process of pushing the viscera from the carcass.

8. A process as claimed in claim 7, characterized in that the angle is between 35° and 40°.

9. A process and claimed in claim 1, characterized in that the pushing of the viscera in the direction from the cranial end towards the caudal end is carried out at a speed between 0.5 and 0.6 meters per second.

10. A process as claimed in claim 1, characterized in that the viscera drops from the rump of the carcass to the viscera collection area over a distance of at least 1,500 mm so that there is sufficient height for the weight of the viscera to cause complete clearance of the viscera from the carcass.

11. A process as claimed in claim 1, characterized in that the public symphysis is split before the pushing operation whereby the viscera can pass both above and below and through the split in the public symphysis.

12. A process as claimed in claim 11, characterized in that the hind legs are held separated during the pushing of the viscera from the carcass, the separation of the hind legs being sufficient to produce a split in the public symphysis of at least 30 mm in width.

13. A process as claimed in claim 12, characterized in that the split in the public symphysis is about 55 mm in width.

14. A process as claimed in claim 1, characterized in that the pubic symphysis is not split prior to the pushing operation whereby the viscera travels over the pubic symphysis and any portions of the viscera which would otherwise pass beneath the pubic symphysis will be lifted and pass with the main bulk of the viscera out between the hind legs after passing over the top of the pubic symphysis.

15. A process as claimed in claim 1, characterized in that the pushing member is inserted into the thoracic cavity generally between the third and fifth ribs and commences to push on the thoracic viscera at about the fifth rib.

16. A process as claimed in claim 1, characterized in that the support means includes a main support and a secondary support to which the pushing member is mounted, the secondary support being resiliently movable relative to main support, the support means including biasing means which urges the pushing member into engagement with the spine so that the pushing member can contour along the spine during the pushing movement thereof.

17. A process as claimed in claim 1, characterized in that the step of pushing the viscera is carried out by pushing means including a pushing member and support means, the support means being operative to insert the pushing member into the thoracic cavity and being operative to drive the pushing member in the direction from the cranial end towards the caudal end so as to push the viscera between the hind legs.

* * * * *